United States Patent [19]

Takahasi et al.

[11] 3,995,977
[45] Dec. 7, 1976

[54] VANE PUMP HOUSING

[75] Inventors: Koichi Takahasi, Yokohama;
Nobuteru Hitomi, Yokosuka;
Tokiyoshi Yanai, Yokosuka;
Manabu Tsunematsu, Yokosuka, all of Japan

[73] Assignee: Nissan Motor Co., Ltd., Japan

[22] Filed: Oct. 29, 1974

[21] Appl. No.: 519,032

Related U.S. Application Data

[62] Division of Ser. No. 399,716, Sept. 24, 1973, Pat. No. 3,877,127.

[30] Foreign Application Priority Data

Sept. 28, 1972 Japan .............................. 47-96642

[52] U.S. Cl. .............................. 418/153; 418/156; 418/255
[51] Int. Cl.² ......................................... F04C 5/00
[58] Field of Search .......... 418/153, 156, 157, 150, 418/255, 178, 159

[56] References Cited

UNITED STATES PATENTS

| | | | |
|---|---|---|---|
| 1,871,525 | 8/1932 | Hudson | 418/255 |
| 3,130,681 | 4/1964 | Fetherston | 418/156 |
| 3,514,232 | 5/1970 | Mitchell et al. | 418/156 |

Primary Examiner—C. J. Husar
Assistant Examiner—Leonard Smith
Attorney, Agent, or Firm—Robert E. Burns; Emmanuel J. Lobato; Bruce L. Adams

[57] ABSTRACT

An annular sleeve is radially deformed within a cylindrical bore to provide a housing for a pump having vanes slidable through slots in an eccentric rotor, the radially opposed edges of the vanes slidably contacting the inner surface of the sleeve.

2 Claims, 6 Drawing Figures

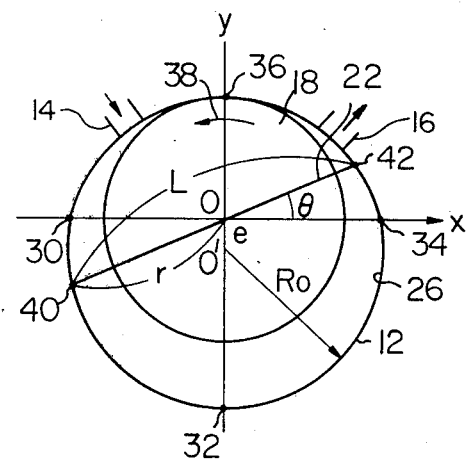
Fig. 1
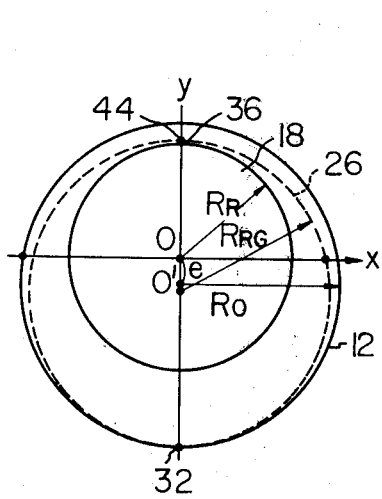
Fig. 2
Fig. 3

VANE PUMP HOUSING

This is a continuation, division, of application Ser. No. 399,716, filed Sept. 24, 1973 now Pat. No. 3,877,127.

The invention relates to a housing comprising a resilient inner sleeve for a pump having vanes slidable through slots in an eccentric rotor, the radially opposed edges of the vanes slidably contacting the inner surface of the sleeve.

This type of pump housing has a right cylindrical interior surface comprising a section of circular profile and a section of non-circular profile, the two sections being smoothly connected to form a closed curve. In the prior art, the interior surfaces of pump housings of this type have been formed either by using expensive computer controlled machine tools, or by approximating the internal profile with a series of circular arcs cut by an ordinary lathe or grinder and finish machining the housing interior to eliminate the cusps produced by the approximate rough machining. In the latter case, such finish machining is quite expensive, and if it is not performed, the vanes of the pump will abrade at a rapid rate.

It is therefore an object of the invention to provide a housing for a vane pump as described above which is inexpensive to manufacture, can be produced using ordinary machine tools, and which has a smooth internal surface which will cause minimum abrasion of pump vanes which slidably contact therewith.

This and other objects of the invention will become more clear from the following description taken in conjunction with the accompanying drawings, in which:

FIGS. 1, 2 and 3 are schematic views which illustrate the geometric basis of the invention;

Figure 4:
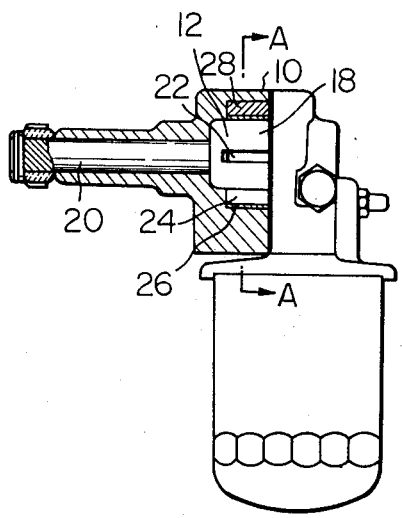
FIG. 4 is a longitudinal view, partly in section, of a pump incorporating therein an embodiment of a pump housing according to the invention.
Figure 5:
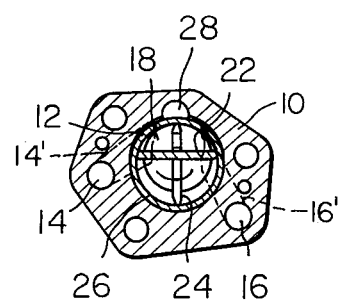
FIG. 5 is a view taken on a line A—A of FIG. 4.

Referring first to FIGS. 4 and 5, there is shown a pump casing including a housing 10 of the invention, which defines therein a bore 12 and inlet and outlet passageways 14 and 16 which respectively communicate with the bore 12 through inlet and outlet ports 14' and 16'. A rotor 18 is rotatable within the bore 12 with a drive shaft 20. Two vanes 22 and 24 are shown as being slidable through slots (no numerals) in the rotor 18, radially opposed edges of which are in constant sliding contact with the inner surface of a resilient annular sleeve 26 disposed in the bore 12. The annular sleeve 26 is radially deformed by means such as a wedge 28 as will be described below in detail. The resilience of the annular sleeve may be uniform or dis-uniform throughout its extent.

Referring now to FIG. 1, the geometric profile of the interior surface of the sleeve 26 is clearly shown, in which numerals 30, 32, 34 and 36 designate points on the profile. The rotor 18 is shown disposed within the sleeve 26 to rotate in the direction of an arrow 38. Only the vane 22 is shown for simplicity.

The rotor 18 rotates about a point 0, which is the origin of a rectangular coordinate system as shown. An arc 30–32–34 is that of a circle of radius $R_o$, which has a center 0' displaced by an offset distance $e$ from the point 0 in a negative direction along the $y$ axis. Edges 40 and 42 of the vane 22 slidably engage with the inner surface of the sleeve 26 as the rotor 18 rotates, the edge 40 being shown as engaging with the inner surface within the arc 30–32–34. As the rotor 18 rotates and the edge 40 moves between the points 30 and 32, an arc 34–36 is traced by the edge 42. As the edge 40 moves between the points 32 and 34, the edge 42 traces an arc 36–30. Thus, a closed curve is generated in which the arc 30–32–34 is circular, and as is obvious to those skilled in the art, the arc 34–36–30 is non-circular. Thus, the interior surface of the sleeve 26 and thus the housing 10 comprises sections of circular and non-circular profile, and as mentioned above, has a right cylindrical configuration.

In terms of a radius vector $r$, the arc 30–32–34 can be expressed as:

$$X = -r\cos\theta \text{ and}$$
$$Y = -r\sin\theta, \text{ or}$$
$$(Y - e)^2 + X^2 = R_o^2$$

Combination of the above equations provides $$r^2 - 2er\sin\theta + e^2 - R_o^2 = 0 \text{ or}$$

$$r = e\sin\theta + (R_o^2 - e^2\cos^2\theta)^{1/2} \quad (1)$$

for $0 \leq \theta \leq \pi$.

Since the arc 34–36–30 is traced by the edge 42, it can be expressed as $$X = (L-r)\cos\theta \text{ and } Y = (L-r)\sin\theta \quad (2)$$

for $0 \leq \theta \leq \pi$, where $L$ is the length of the vane 22.

It is understood that the relationship between the edges 40 and 42 is reversed as the edge 42 enters the arc 30–32–34 and the edge 40 enters the arc 34–36–30.

Assuming for simplicity that the thickness of the sleeve 26 is infinitesimal and that it is perfectly resilient, it is proposed by the invention that if the sleeve 26 has an outer (or inner) circumference equal to the length of the arc 30–32–34–36–30, that the bore 12 is cylindrical and has a radius $R_o$, and the wedge 28 (FIG. 5) radially deforms the sleeve 26 by a predetermined amount along the Y axis so that its diameter along the Y axis is equal to L, and that the inner profile of the sleeve 26 and thus the housing 10 will closely approximate the configuration expressed by equations (1) and (2). It has been determined experimentally using sleeves of finite thickness that this phenomenon actually occurs.

In practice, the thickness of the sleeve 26 must be taken into account, which is facilitated by the fact that the inner and outer surfaces of the sleeve 26 are concentric. The inner circumference of the sleeve 26 is selected to have a value equal to the arc length 30–32–34–36–30, and the radius of the bore 12 is selected to be a value substantially equal to $R_o$ plus the thickness (not designated) of the sleeve 26, although empirical corrections may be made if necessary for the resilient characteristics of the sleeve 26.

The arc length 30–32–34–36–30 is computed as follows:

An arc length $l_1$ is $$l_1 = R_o(\pi + 2\sin^{-1}e/R_o)$$

where $l_1$ is the arc length 30–32–34, since it is a circular arc.

An arc length $l_2$ is then computed from the following integral equation:

$$l_2 = 2 \int_o^{\pi/2} \left[ \left( (L-r)d\Theta \right)^2 + (dr)^2 \right]^{1/2} =$$

$$2 \int_o^{\pi/2} \left\{ (L-r)^2 + \left( \frac{dr}{d\Theta} \right)^2 \right\}^{1/2} d\Theta$$

where $l_2$ is the arc length 34–36–30.

The inner circumference of the sleeve 26, designated as $S_o$, is $$S_o = l_1 + 2$$

where $S_o$ is the circumference 30–32–34–36–30.

A radius $R_{RG}$, representing the inner radius of the sleeve 26, is then $$R_{RG} = S_o/2\pi.$$

FIGS. 2 and 3 illustrate the process of deforming the sleeve 26, assuming for simplicity that it has an infinitesimal thickness. The rotor 18 is fixed in place on the shaft 20 within the bore 12, and the sleeve 26 is inserted loosely into the bore 12 with its bottom (as shown) contacting the inner surface of the bore 12 at the point 32. The bore 12, sleeve 26, and rotor 18 have radii $R_o$, $R_{RG}$ and $R_R$ respectively such that $$R_o > R_{RG} > R_R.$$

The wedge 28 is then inserted into a recess (no numeral) in the housing 10 such that it applies a radial force P to the sleeve 26 in the −Y direction. The dimensions of the wedge 28 are selected such that the sleeve 26 will be radially deformed along the Y axis to an extent that its diameter along the Y axis will be substantially equal to L, and its chord along the X axis will assume the value L. The radius $R_R$ of the rotor 18 is selected so that the top (as shown) of the rotor 18 will be closely adjacent to the inner surface of the sleeve 26 at the point 36 as the top of the sleeve 26 is deformed from its initial position 44 to the position 36. The final position of the sleeve 26 in relation to the bore 12 and the rotor 18 is shown in FIG. 3.

Figure 6:
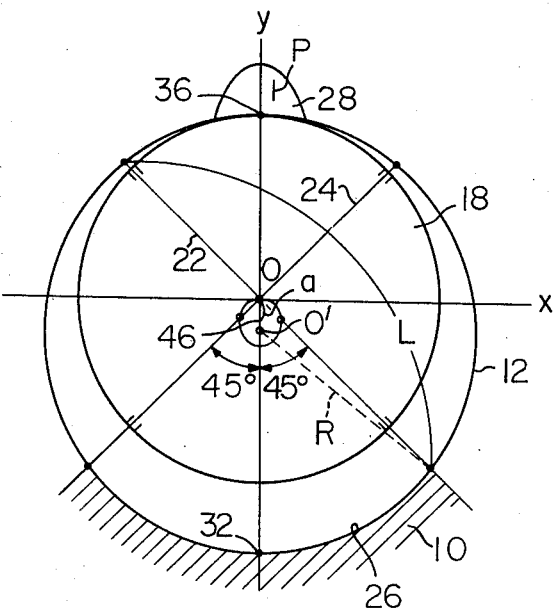
FIG. 6 is a schematic view illustrating the assembly of a pump rotor and vane assembly into a pump housing embodying the invention.

FIG. 6 shows a preferred method of assembling the complete rotor and vane assembly into the housing 10. The vanes 22 and 24 are assembled into the respective slots in the rotor 18, and the rotor 18 is fixed in place of the shaft 20. The sleeve 26 is then placed in position in the bore and the rotor 18 and vanes 22 and 24 inserted in the sleeve. In order to minimize the stresses produced during deformation of the sleeve 26, the vanes 22 and 24 are oriented at angles of 45° to the Y axis as shown. The wedge 28 is then inserted to deform the sleeve 26 to its final position.

For reference, a practical example of the dimensions of an experimentally successful pump housing produced in accordance with the invention is listed below:

| | |
|---|---|
| Diameter of bore 12 | Approx 1.44 inch (36.64mm) |
| Rotor 18 offset (e) | Approx 0.12 inch (3mm) |
| Sleeve 26 O.D. | Approx 1.43 inch (36.38mm) |
| Sleeve 26 I.D. | Approx 1.35 inch (34.38mm) |
| Sleeve 26 displacement (44—36) | Approx 0.01 inch (0.38mm) |
| Vane 22 or 24 length | Approx 1.34 inch (34mm) |

If desired the rotor 18 may be adapted for eccentric rotation within the sleeve 26 about a crank arm (not shown) having a length $a$ and center at a point 46 as is clearly shown in FIG. 6.

Thus, a pump housing of the invention can be manufactured cheaply and easily, and provides a highly finished interior surface of the required configuration for slidable engagement with pump vanes carried by a rotor.

What is claimed is:
1. A vane pump comprising:
   a casing having therein a bore with a substantially circular profile and fluid inlet and outlet ports respectively communicating with said bore;
   an annular resilient sleeve disposed in said bore so that the centers of said bore and said annular resilient sleeve are offset eccentrically, and having formed therein a pair of apertures respectively communicating with said inlet and outlet ports, said annular resilient sleeve having a wall thickness substantially uniform through the whole thereof;
   a rotor rotatably disposed in said annular resilient sleeve and having a plurality of axial slots formed therein;
   a plurality of vanes slidable in respective slots, said vanes protruding radially from said rotor so as to sealingly contact the inner wall of said annular resilient sleeve, said rotor being rotatable about a center which is offset from the center of said bore by a predetermined amount;
   deforming means disposed in said casing to exert a deforming force inwardly on said resilient sleeve to increase the sealing contact between said sleeve and said vanes;
   said deforming means being arranged to deform said resilient sleeve a predetermined amount in a plane containing the two centers of said rotor and said bore; and
   said annular resilient sleeve being guided along the generally half peripheral cylindrical wall thereof by said circular profile of said casing.
2. A vane pump as claimed in claim 1, in which said annular resilient sleeve is made of a thin readily deformable material.

* * * * *